US007692651B2

(12) United States Patent
Xue et al.

(10) Patent No.: US 7,692,651 B2
(45) Date of Patent: Apr. 6, 2010

(54) METHOD AND APPARATUS FOR PROVIDING EFFICIENT SPACE LEAPING USING A NEIGHBOR GUIDED EMPTINESS MAP IN OCTREE TRAVERSAL FOR A FAST RAY CASTING ALGORITHM

(75) Inventors: Daqing Xue, Plainsboro, NJ (US); Lining Yang, East Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 563 days.

(21) Appl. No.: 11/525,711

(22) Filed: Sep. 22, 2006

(65) Prior Publication Data

US 2007/0064002 A1     Mar. 22, 2007

Related U.S. Application Data

(60) Provisional application No. 60/719,734, filed on Sep. 22, 2005.

(51) Int. Cl.
*G06T 17/00*     (2006.01)
(52) U.S. Cl. .................................................. 345/424
(58) Field of Classification Search ........................ None
See application file for complete search history.

(56) References Cited

U.S. PATENT DOCUMENTS 6,654,012 B1 * 11/2003 Lauer et al. ................. 345/424

| 6,868,420 | B2 * | 3/2005 | Perry et al. ................. 707/100 |
| 6,999,078 | B1 * | 2/2006 | Akerman et al. ............ 345/424 |
| 2002/0190984 | A1 * | 12/2002 | Seiler et al. ................. 345/424 |
| 2007/0040833 | A1 * | 2/2007 | Buyanovski ................. 345/426 |

OTHER PUBLICATIONS

Jane Wilhelms, Allen Van Gelder, "Octrees for Faster Isosurface Generation," Jul. 1992, ACM Transactions on Graphics (TOG), vol. 11 No. 3, pp. 201-227.*
R. Grosso, C. Lurig, T. Ertl, "The Multilevel Finite Element Method for Adaptive Mesh Optimization And Visualization of Volume Data," 1997, Eighth IEEE Visualization 1997.*
John Danskin, Pat Hanrahan, "Fast Algorithms for Volume Ray Tracing," Oct. 19, 1992, Proceedings of the 1992 Workshop on Volume Visualization, pp. 91-98.*
J. Kruger and R. Westermann, "Acceleration Techniques for GPU-based Volume Rendering," Oct. 19, 2003, Proceedings of IEEE Visualization 2003, pp. 287-292.*

* cited by examiner

*Primary Examiner*—Jason M Repko
(74) *Attorney, Agent, or Firm*—Peter L. Kendall

(57) ABSTRACT

An apparatus and method are provided for providing efficient space leaping using neighbor guided emptiness map in octree traversal for fast ray casting. The apparatus and method include providing a min-max octree structure, marching a ray through the min-max structure; and skipping empty nodes associated with the min-max structure along the direction of the ray based on a memory byte included in each node comprising an emptiness state of neighbor nodes and a current node.

17 Claims, 4 Drawing Sheets

METHOD AND APPARATUS FOR PROVIDING EFFICIENT SPACE LEAPING USING A NEIGHBOR GUIDED EMPTINESS MAP IN OCTREE TRAVERSAL FOR A FAST RAY CASTING ALGORITHM

PRIORITY

This application claims priority of U.S. Provisional Patent Application Ser. No. 60/719,734, filed on Sep. 22, 2005. The contents of this provisional application is hereby incorporated by reference in its entirety.

BACKGROUND OF THE INVENTION

1. Field of the Invention

The present invention relates to a method and apparatus for providing volume graphics. More particularly, the present invention relates to a method and apparatus for providing efficient space leaping using a neighbor guided emptiness map.

2. Description of the Related Art

Volume graphics is the subfield of computer graphics that deals with the visualization of objects or phenomena represented as sampled data in three or more dimensions. These samples are called volume elements, or "voxels," and contain digital information representing physical characteristics of the objects or phenomena being studied. For example, voxel data for a particular object may represent density, type of material, temperature, velocity, or some other property at discrete points in space throughout the interior and in the vicinity of the object.

Voxel-based representations of objects occur in many situations and applications. For example, tomographic scans and nuclear magnetic resonance scans of a human body or industrial assembly produce three dimensional arrays of data representing the density and type of material comprising the body or object.

In the past, two methods have been available for this purpose. One method is to construct a series of parallel two-dimensional image slices, each representing a slightly different cross section of the object being viewed. This is the method typically used by radiologists when viewing computed tomography scans or nuclear magnetic resonance scans of the human body. Radiologists are trained to construct three-dimensional mental pictures of the internal organs of the body from these series of two-dimensional images. The slices are, in general, parallel to one of the primary dimensions or axes of the body, so that they represent the "sagittal," "axial," and "coronal" views that are familiar to radiologists. This method of visualizing voxel-based data is difficult, requires years of training, and is prone to uncertainty, even by the most expert practitioners.

Another method is to convert voxel data into representations suitable for computer graphics systems to display. Most computer graphic systems today are designed to display surfaces of objects by subdividing those surfaces into small triangles or polygons. These triangles are assigned colors and levels of transparency or opacity, then converted into pixels, that is picture elements, and projected onto the computer screen. Triangles corresponding to surfaces in the foreground obscure those corresponding to surfaces in the background. Triangles can also be colored or painted with textures and other patterns to make them look more realistic. Additional realism is made possible by simulating the position and effects of lights, so that highlights and shadows appear on the resulting image. The art and science of this kind of graphics system is well-developed and described by a large body of literature such as the textbook "Computer Graphics: Principles and Practice," 2.sup.nd edition, by J. Foley, A. vanDam, S. Feiner, and J. Hughes, published by Addison-Wesley of Reading, Mass., in 1990, which is incorporated herein in its entirety by reference.

In recent years, an alternative method has emerged called volume rendering. Specifically, the process of creating a viewable image from computer data is called "rendering," and the process of creating a viewable image from voxel data is called "volume rendering". More specifically, this method is a form of digital signal processing in which the individual voxels of a voxel-based representation are assigned colors and levels of transparency or opacity. The mechanism for mapping the data values of individual voxels to colors and transparencies is called a "transfer function". The voxels are then projected onto a two-dimensional viewing surface such as a computer screen, with opaque voxels in the foreground obscuring other voxels in the background. This accumulation of projected voxels results in a visual image of the object. Lighting calculations can be done on the individual voxels to create the appearance of highlights and shadows in a similar manner to that of conventional computer graphics.

By changing the assignment of colors and transparency to particular voxel data values, different views of the exterior and interior of an object can be seen. For example, a surgeon who needs to examine the ligaments, tendons, and bones of a human knee in preparation for surgery can utilize a tomographic scan of the knee and cause voxel data values corresponding to blood, skin, and muscle to appear to be completely transparent. In another example, a mechanic using a tomographic scan of a turbine blade or weld in a jet engine can cause voxel data values representing solid metal to appear to be transparent while causing those representing air to be opaque. This allows the viewing of internal flaws in the metal that would otherwise be hidden from the human eye.

It should be noted that there are a number of techniques to take the data points or voxels representing an object and project them onto a flat viewing surface such as a computer screen. In each of these techniques, an object to be viewed is positioned relative to the viewing surface by translating the three dimensional sampled data representing that object to the spatial coordinates of the space in front of or behind the viewing surface. The techniques consist of different methods of computing the color and intensity of the light at discrete points or "pixels" on that viewing surface.

Direct volume rendering is an important technique for visualizing 3-D medical datasets. With advancements in computational processing and medical devices, the size of the 3D volumetric datasets are rapidly increasing. The "Visible Human Project" from the National Library of Medicine produced massive datasets having the size of 512×512×1728 (864 MB). The new Computed Tomography (CT) machine from Siemens Medical, for example, can generate a dataset having the size of 512×512×4096. The interactivity of the rendering tool is very important for medical professionals to diagnose diseases based on such large datasets.

Direct volume rendering has been well researched by the visualization community. Ray-casting, Splatting, Shear-warp and 3D texture mapping are the most common volume rendering techniques. Among these technologies Ray-casting can generate the highest quality images and the algorithms scale well with the increase of the dataset size as disclosed in M. Levoy, "Display of Surfaces From Volume Data", IEEE Computer Graphics and Applications, 8(5):29-37, 1988, which is incorporated herein by reference in its entirety. However, interactivity is difficult to achieve using the brute-force approach due to the intensive memory access requirement and computational processing requirement of the algorithm.

Similarly, shear-warping is currently considered the fastest software based technique. Unfortunately, this method suffers from artifacts due to insufficient sampling rates along the z-axis and the bilinear interpolation. One solution is to use trilinear interpolation and super-sampling as implemented in Volume Pro as disclosed in H. Pfister, J. Hardenbergh, J. Knittel, H. Lauer, and L. Seiler, "Volume Pro Real-Time Ray-Casting System", SIGGRAPH.99, pp. 251-260, the entire contents of which is incorporated herein in its entirety by reference. However, the data size is limited to no more than $256^3$ due to the memory size on the board.

The additional data structure like octree disclosed in M. Levoy. "Efficient Ray Tracing of Volume Data", ACM Transactions on Graphics, 9(3), 1990, 245-261, which is incorporated herein in its entirety by reference, is proposed to efficiently skip empty space in the volume. However, this is not adequately done to overcome the problems of artifacts.

Thus, there is a need for a system and method for reducing memory access when traversing octrees thus mitigating cache misses and speeding up the rendering without the problems encountered in the prior art.

SUMMARY OF THE INVENTION

It is therefore an object of the present invention to provide a system and method where quality reconstructed images can be obtained in accordance with an embodiment of the present invention. The system and method store and retrieve a neighbor-guided emptiness map to guide space leaping with adaptive step size in a multi-resolution octree traversal.

In accordance with another aspect of the present invention, the apparatus and method provide a min-max octree structure, marching a ray through the min-max structure, and skipping empty nodes associated with the min-max structure along the direction of the ray based on a memory byte included in each node comprising an emptiness state of neighbor nodes and a current node.

BRIEF DESCRIPTION OF THE DRAWINGS

Several exemplary embodiments of the present invention will now be described in detail with reference to the accompanying drawings.

In the drawings, the same or similar elements are denoted by the same reference numerals even though they are depicted in different drawings.

DETAILED DESCRIPTION OF EXEMPLARY EMBODIMENTS

In the following description, a detailed description of known functions and configurations incorporated herein has been omitted for conciseness.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from R.sup.3 to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 1:
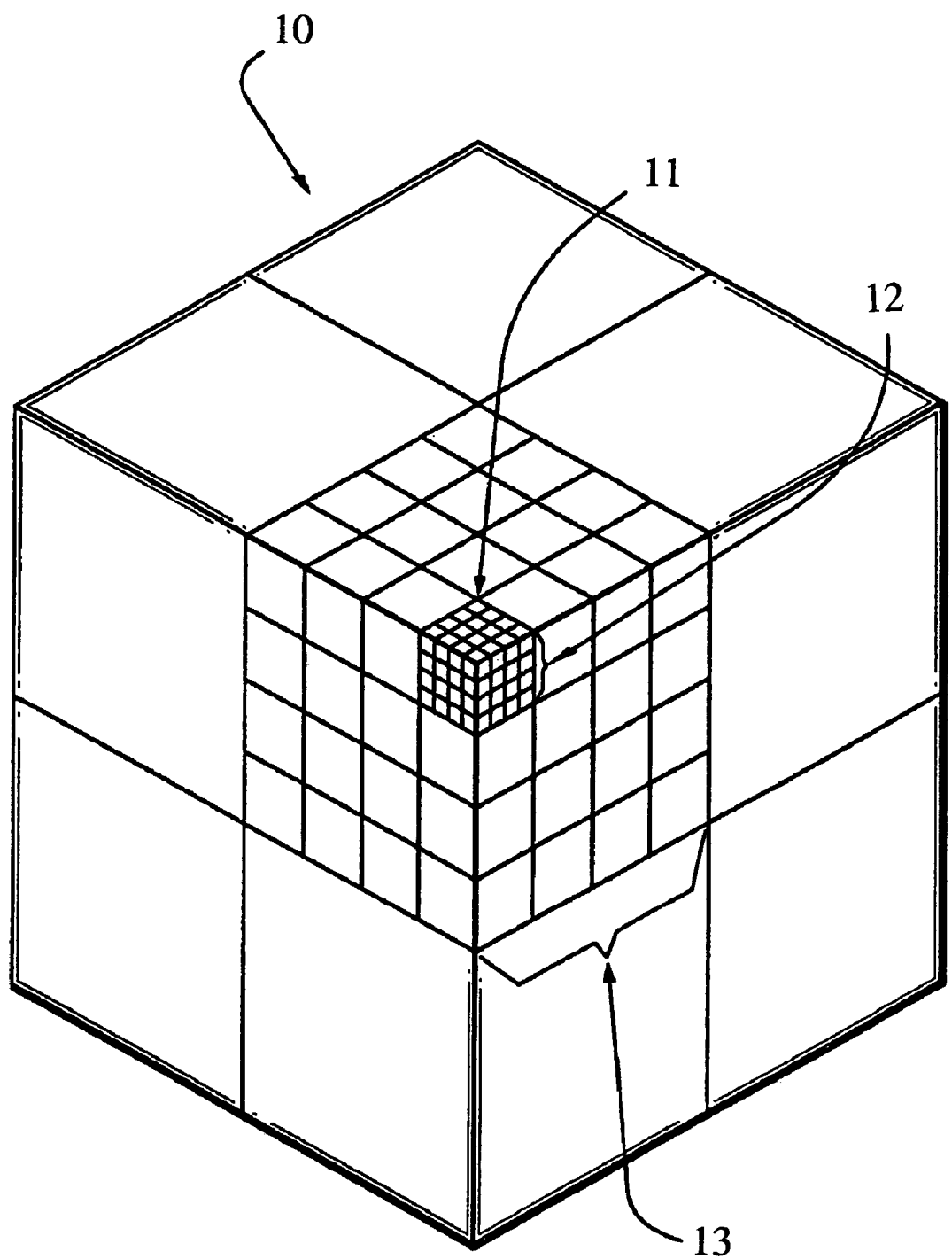
FIG. 1 is a diagram illustrating an exemplary reduced path octree in accordance with an embodiment of the present invention.

According to an embodiment of the invention, a reduced path octree data structure 10 is depicted in FIG. 1. In a reduced path octree, the number of intermediate layers have been reduced. The non-limiting example depicted in FIG. 1 is a two layer octree having a lower level with 4×4×4 nodes and an upper level with 16×16×16 nodes. Each 4×4×4 node 12 is associated with a list of the 64 voxels 11 contained therein, while each 16×16×16 node 13 is associated with the 64 4×4×4 nodes 12 contained therein. The entire image volume 10 comprises 2×2×2 nodes 13 of size 16×16×16. Associated with each node at each level is a minimum and maximum value of all the nodes/voxels contained within the node. Reducing the number of intermediate layers reduces the additional memory needed by the data structure, and reduces the complexity of the indexing. Each layer can be treated as a sub-sampled volume and the indexing relationship between different layers for the corresponding nodes is implicit with no additional required pointers.

The ray is marched at the second level of the 16×16×16 node with an exemplary step size of 16. If the Min-Max structure indicates that the current node is not empty, the ray goes down to the lower level e.g., the first level with a node of 4×4×4 in our case. If the 4×4×4 node is non-empty too, the volume in the voxel level is sampled with an exemplary unit step size of 1; otherwise the current 4×4×4 node is skipped. Once the ray goes out of the current 16×16×16 node, the ray advancing is performed at the second level with an exemplary step size of 16 again. This process is repeated until the ray exits the volume.

Figures 2A, 2B:
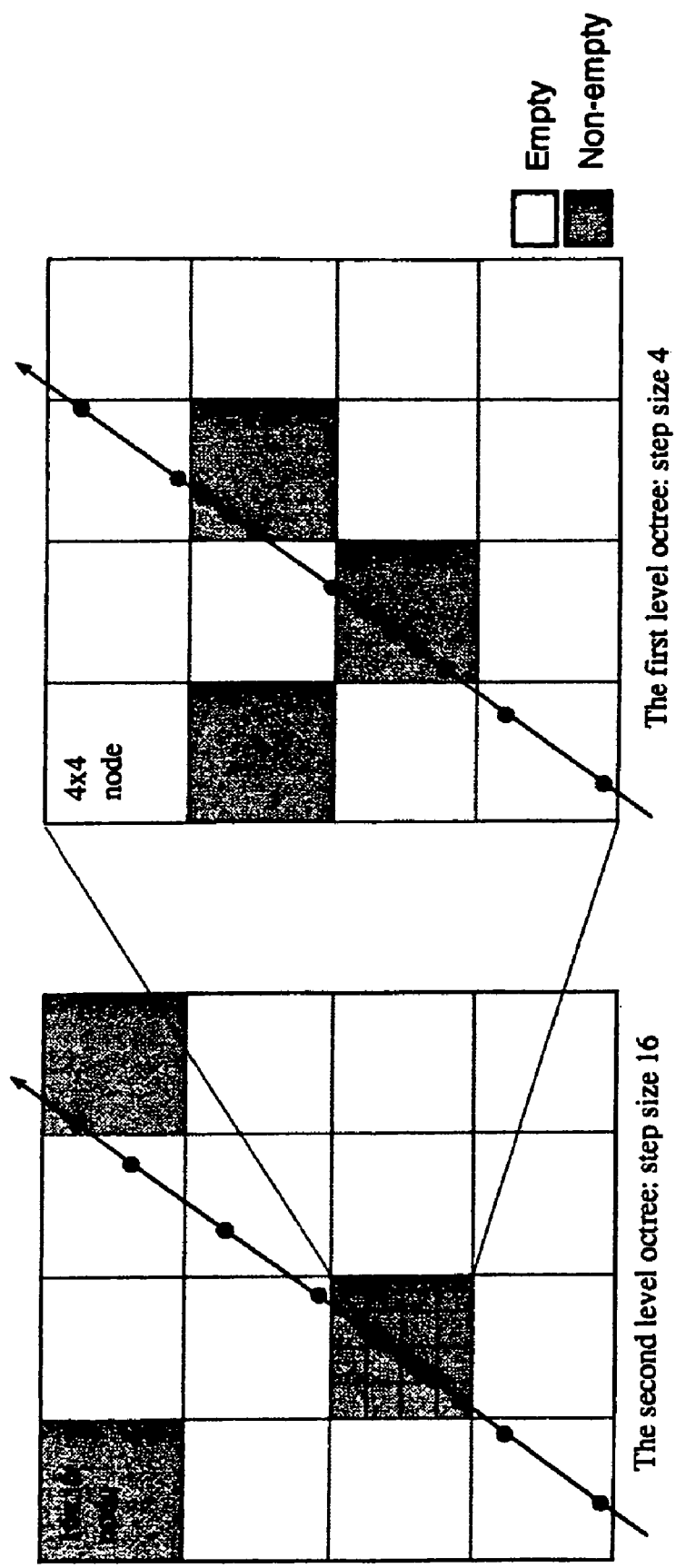
FIG. 2A is a schematic diagram illustrating ray transversing a second level octree with a node having 16×16×16 voxels in accordance with an embodiment of the present invention.
FIG. 2B is a schematic diagram illustrating ray transversing a second level octree with a node having 16×16×16 voxels in accordance with an embodiment of the present invention.

FIG. 2A is a schematic diagram illustrating a ray transversing a second level octree with a node having 16×16×16 voxels in accordance with an embodiment of the present invention, and FIG. 2B is a schematic diagram illustrating a ray transversing a second level octree with a node having 16×16×16 voxels in accordance with an embodiment of the present invention. Specifically, FIGS. 2A and 2B show how the ray marches in the two level octrees. More specifically, FIGS. 2A and 2B illustrate how the ray advances with a step size of 16 if the node of 16×16×16 voxels is empty, and the ray advances with a step size of 4 if the node of 4×4×4 voxels is empty. A discussion on the advancement of rays is disclosed in United States Patent Application Publication No. 2005/0286748 filed Jun. 22, 2005, the entire contents of which is incorporated herein by reference in its entirety. It should be noted that to efficiently skip empty space with the adaptive step size in the different level octree, the node's neighbor emptiness information must be known to guide the correct space leaping.

In embodiments of the present invention, there are two exemplary cases when traversing the octree for the current octree node: 1) the current node is non-empty; 2) the current node is empty. For the first case, sampling is performed at the lower level if necessary as illustrated in FIG. 2A. For the empty node, the empty space is skipped. To efficiently skip the empty space from the current empty node, its necessary to know whether its immediate neighbor on the leaping direction is empty or not. If the neighbor is also empty, the space can be leaped with the step size in the current octree level, otherwise the ray front should preferably stop at the first sample in the neighbor.

In accordance with an embodiment of the present invention, a straightforward method to obtain the neighbor emptiness information is to access the current node's three immediate neighbors along the leaping direction. However, these additional memory accesses will increase cache misses because usually they are not stored in a memory friendly way. This significantly reduces the performance of octree traversal. It should be appreciated by those skilled in the art that the present invention is not limited to three immediate neighbors. Neighbors greater or less or non immediate can also be used without departing from the scope of the present invention.

Figure 3B:
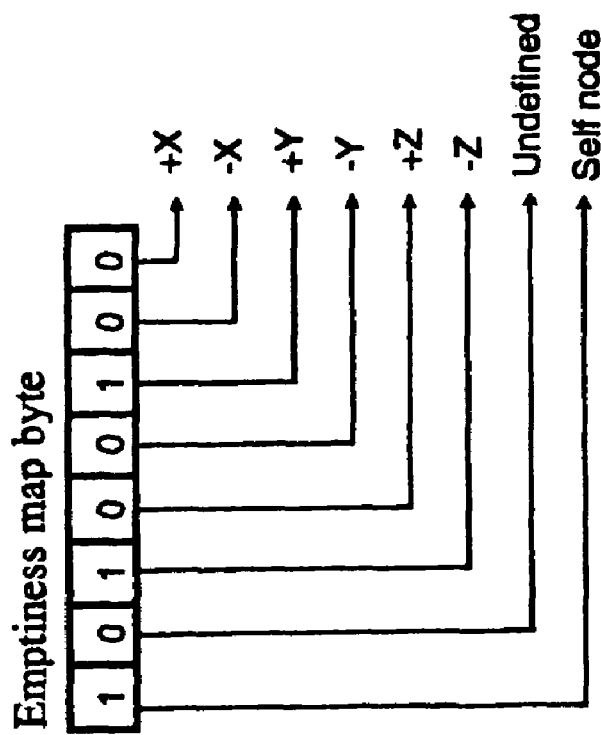
FIG. 3B is a diagram illustrating bits in an emptiness map byte for indicating whether corresponding nodes are empty or not wherein 1 indicates non-empty and 0 indicates empty in accordance with an embodiment of the present invention.
Figure 3A:
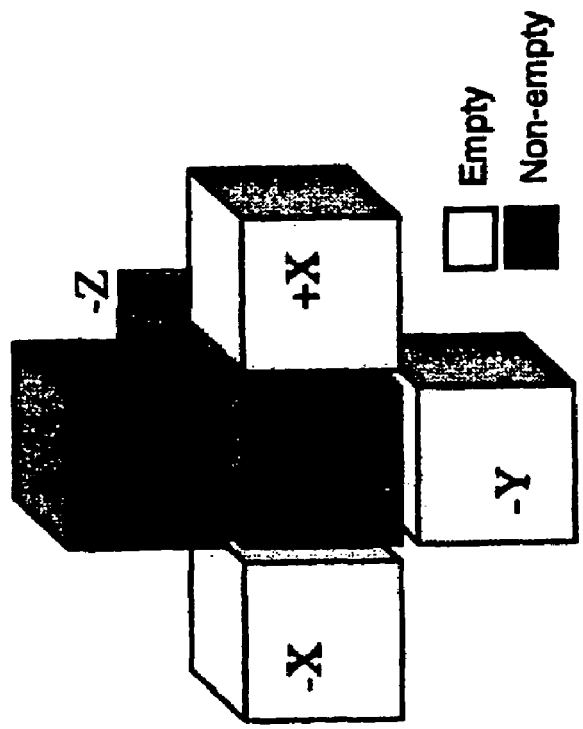
FIG. 3A is a block diagram illustrating an octree node and its six immediate neighbors in accordance with an embodiment of the present invention.

In accordance with an embodiment of the present invention, to solve the problem of reduced performance, both the current node and its six immediate neighbors' emptiness information in each node are stored. To minimize the memory cost, one byte referred to as an emptiness_map_byte is used to store the information for each node. Seven bits of this byte (8 bits) are used to indicate whether the involved nodes are empty or not. Bits 0 to 5 can be used to store neighbor emptiness information and bit 7 for self emptiness information. Bit 6 can be used to indicate whether this node has been updated with useful information, which will be discussed in more detail below with reference to runtime emptiness map calculation. To reduce the possible cache misses, the bytes in all the octree nodes are grouped into a 1D array, as a neighbor-guided emptiness map. FIG. 3A shows one octree node and its six immediate neighbors and one byte indicating its emptiness information. The emptiness map is updated whenever the transfer function changes. It should be noted that only five immediate neighbors are drawn for the purpose of clarity. For example, the neighbor in the +z direction is not drawn for clarity.

An objective for traversing the octrees is to maintain the computation efficiency and to reduce cache misses as much as possible. In accordance with an embodiment of the present invention, for the ray marching scheme, the three out of six immediate neighbor nodes which are in the ray marching direction are considered. It is not neccessary to calculate which exact immediate neighbors that the ray will go in. This avoids complicated calculations or excess branch instructions that may degrade the performance of the octree traversal as disclosed in J. Amanatides, A. Woo. "A Fast Voxel Traversal Algorithm for Ray Tracing", Proceedings of Eurographics'87, 1987, which is incorporated herein by reference in its entirety. Instead, since the emptiness information of the node and its six neighbors has been encoded into one byte and stored in the emptiness map, we just use two proper masks to retrieve the emptiness information for the node itself and its 3 neighbors in the advancing direction. For a given ray marching direction, $\bar{v}(dx,dy,dz)$ the sign of the three components of $\bar{v}$ to produce the neighbor mask is used. The bit-wise operations in equation (1) and (2) below are used to calculate the node and its neighbor masks, respectively. Equation one indicates that the $7^{th}$ bit of the node_mask byte is set to 1 and all the other bits are set to 0. This assists in retrieving the $7^{th}$ bit of the emptiness_map_byte by a bitwise AND operation of node_mask_byte and emptiness_map_byte. In Equation 2, all the bits of neighbor_mask_byte are set to 0. And then bits 0 through 5 are set to 1 or zero according to the direction of the ray. Using a bitwise AND operation of the neighbor_mask_byte and emptiness_map_byte information concerning whether any of the immediate three neighbors are empty or not can be retrieved. For example, if the $\bar{v}=(1,0,-1)$, the neighbor mask comprises 0x21. It should be noted that the neighbor mask is updated per view instead of per ray:

node_mask_byte[0.6]=0 node_mask_byte[7]=1   (1)

neighbor_mask_byte[0.7]=0 neighbor_mask_byte[0]=1 if dx>0 neighbor_mask_byte[1]=1 if dx<0 neighbor_mask_byte[2]=1 if dy>0 neighbor_mask_byte[3]=1 if dy<0 neighbor_mask_byte[4]=1 if dz>0 neighbor_mask_bytet[5]=1 if dz<0   (2)

When the user changes the transfer function, it will take some time to pre-calculate the emptiness map. It may be annoying for the transfer-function-change-frequently application. In accordance with an embodiment of the present invention, a runtime method to calculate the emptiness map is provided. The $7^{th}$ bit (emptiness_map_byte[6]) in the emptiness_map_byte is used to indicate whether the node's emptiness information is defined or not as shown in FIG. 3B. Only if emptiness_map_byte[6] is 0, does the node's emptiness information need to be updated. After the transfer functions changes, the first few views are updated with the correct emptiness information and the corresponding bits in the emptiness_map_byte are set and the $6^{th}$ bit is updated to 1. It should be noted that for each view, only a small portion of the emptiness_map_node which are visible for the current view and still haven't been updated yet will be touched. For those visible nodes that have already been updated with the emptiness information, they are retrieved in the previously discussed manner. After one round of rotation all the visible nodes' emptiness information are calculated. In accordance with an embodiment of the present invention, an exemplary pseudo-code for runtime emptiness map calculation is presented below:

```
For each ray
    Traverse the ray in octree
        For the traversed node
            If the node's emptiness_map_byte[6] == 0
                Update node's emptiness information
```

```
        emptiness_map_bytes[6] = 1
      End if
      Space leaping or sampling
    End for
  End for
```

The experiments were performed on a Dell™ 450 workstation equipped with a dual Intel® Xeon™ 3.0 GHZ processor CPUs and 1 GB system memory. The rendering speed of a dataset comprising lung, golden lady, and sensation 16 runoff is shown in Table 1. Compared to the initial octree traversal in other methods, the current performance speedup comes from two sources. Firstly, in other methods, the Min-Max structure and an alpha-summed transfer function lookup table are used to determine whether the current node is empty or not. This involves 4 read operations, 2 for accessing the min-max values from the octree and 2 for indexing into the look up table using mm-max values. These read operations occur in a cache-unfriendly way for all nodes traversed by each ray. Using the exemplary methods in accordance with embodiments of the present invention, only one read operation is needed. Secondly, in other methods to obtain the neighbor emptiness information, the additional 12 read operations for the possible 3 neighbor nodes are needed for guiding the ray leap if the current node is empty. However, in accordance with an embodiment of the present invention, there is no more additional memory access required for neighbors since the emptiness information of the neighbors has already been encoded into the same byte and read in already. For run time emptiness map calculation, only a small part of the rays for the first few views need to update the nodes' emptiness information and the overhead is much less compared to the old brute force method.

TABLE 1

| | | Rendering Speed (FPS) | |
|---|---|---|---|
| Dataset | Dimension | Interactive Mode | Final Mode |
| Lung | 512 × 512 × 500 | 9.7 | 3.7 |
| Golden Lady | 512 × 512 × 625 | 9.6 | 4.5 |
| Sensation 16 Runoff | 512 × 512 × 1892 | 5.0 | 1.9 |

Figure 4:
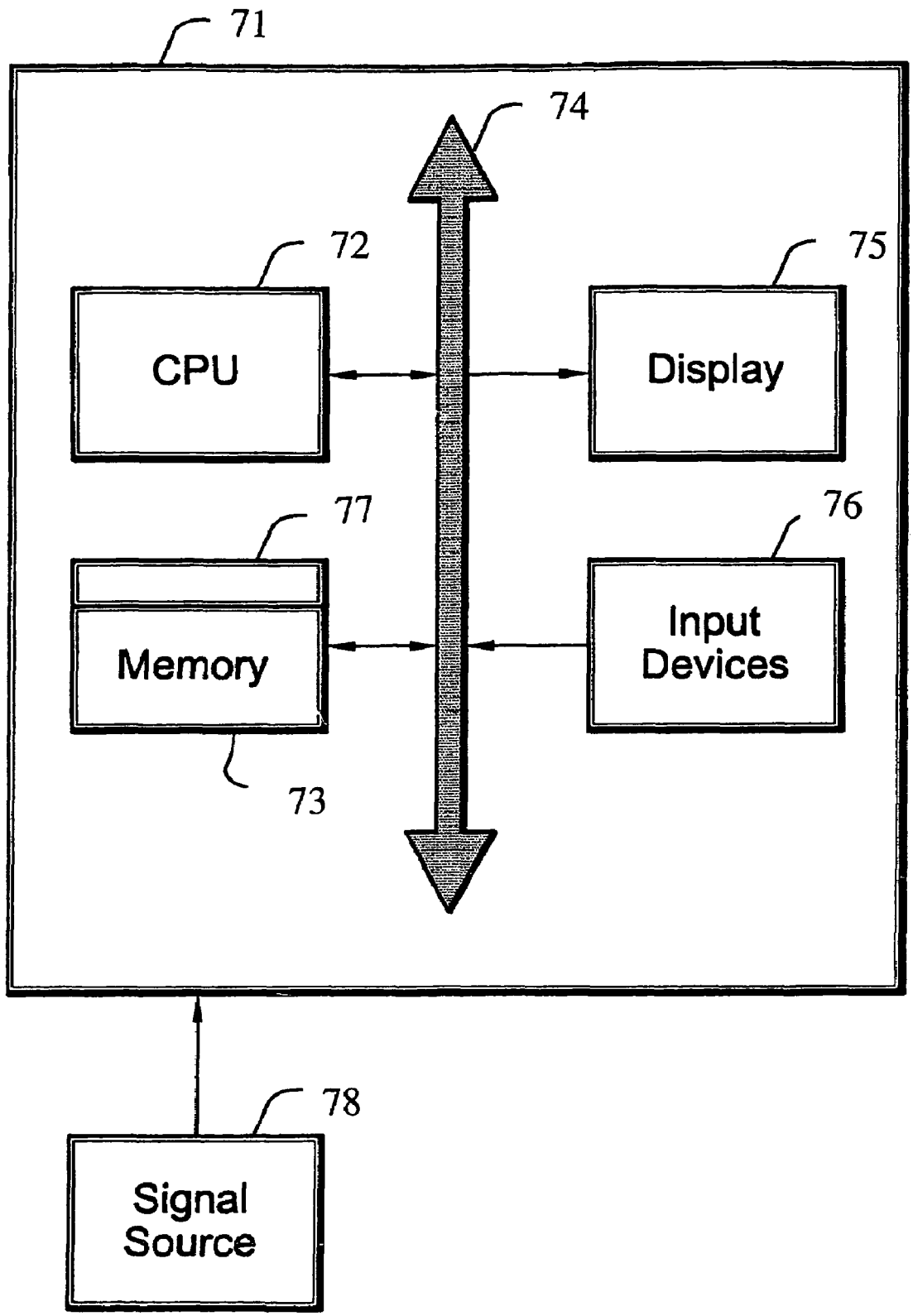
FIG. 4 is a diagram illustrating an exemplary data processing system for implementing a method to perform efficient space leaping using neighbor guided emptiness in accordance with an embodiment of the present invention.

Referring now to FIG. 4, according to an embodiment of the present invention, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been shown and described with reference to certain embodiments thereof, it will be understood by those skilled in the art that various changes in form and details may be made therein without departing from the spirit and scope of the invention as defined by the appended claims.

What is claimed is:

1. A method for image based rendering datasets, said method comprising:
   (a) providing a digitized volumetric comprising a plurality of intensities corresponding to a domain of voxels in a 3-dimensional space;
   (b) performing a pre-processing step, said preprocessing step comprising constructing a min-max Reduced Path Octree data structure and storing emptiness information for each node in the min-max Reduced Path Octree data structure in one memory byte, wherein the min-max Reduced Path Octree data structure comprises a plurality of levels and each of the memory byte includes emptiness state of a given node and the six immediate neighbors in the min-max Reduced Path Octree data structure, wherein bits 0 to 5 of the memory byte are used to store emptiness state information of the six immediate neighboring nodes, bit 6 of the memory byte is used to indicate whether the current node has been updated with useful information and bit 7 is used to store the emptiness state information of the given Reduced Path Octree node;
   (c) generating a 2-D image by casting a ray from each pixel of the image into the volume;
   (d) visiting each level of the Reduced Path Octree node and determining the emptiness of nodes at each level from the corresponding memory byte during the advancing of said ray; and
   (e) sampling along the ray inside only the non-empty nodes of the Reduced Path Octree data structure and skipping empty nodes associated with the min-max Reduced Path Octree data structure along the direction of the ray based on said memory byte included in each node.

2. The method according to claim 1, wherein the at least two levels comprises a 4×4×4 node and a 16×16×16 node.

3. The method according to claim 2, wherein the 4×4×4 node comprises minimal and maximal values of 64 voxels included in the min-max Reduced Path Octree data structure.

4. The method according to claim 2, wherein the 16×16×16 node comprises minimal and maximal values of $16^3$ voxels included in the min-max Reduced Path Octree data structure.

5. The method according to claim 1, wherein the memory byte comprises a 1 bit to indicate a non-empty state.

6. The method according to claim 1, wherein the memory byte comprises a 0 bit to indicate an empty state.

7. The method of claim 1, further comprising an adaptive ray sampling algorithm using the Reduced Path Octree.

8. The method of claim 7, wherein a step size of the ray sampling corresponds to a size of the node of each level of the Reduced path Octree;
(f) after the step (e), reducing the sampling step size to the size of the node;
(g) repeating the steps (d)-(f) until a voxel level is reached; and
(h) interpolating each sample and compositing the sample into a rendering of an image.

9. The method of claim 8, wherein a node is empty if a difference of a summed area table entry of a minimum value of said node and the summed area table entry of a maximum value of said node is substantially the same.

10. The method of claim 8, wherein the step (d) further comprises determining the emptiness of a current node and its neighboring nodes based on the bits 0 to 5 and the bit 7 of said memory byte to avoid skipping a non-empty neighboring node using a larger than unit step size.

11. The method of claim 8, wherein the step (d) further comprises advancing the ray using the step size corresponding to said level, if neighboring nodes and a current node are empty.

12. The method of claim 8, further comprising visiting the node in a next lower level and reducing the ray step size corresponding to the next lower level, if the current node is not empty.

13. The method of claim 12, further comprising interpolating and compositing the samples along said ray if the next lower level is at the voxel level.

14. The method of claim 8, further comprising visiting the node in the next lower level and reducing the ray step size corresponding to the next lower level, if a current node is empty and the neighbor nodes are not empty.

15. The method of claim 14, further comprising looping through the node using said ray step size without interpolating and compositing if the next lower level is at the voxel level, until the ray exits the node.

16. A computer system having a series of computer programmable instructions capable of being executed by a processor of the computer system for performing a method of efficient space leaping using a neighbor guided emptiness map, the method comprising:
providing a digitized volumetric comprising a plurality of intensities corresponding to a domain of voxels in a 3-dimensional space;
performing a pre-processing step, said preprocessing step comprising constructing a min-max Reduced Path Octree data structure and storing emptiness information for each node in the min-max Reduced Path Octree data structure in one memory byte, wherein the min-max Reduced Path Octree data structure comprises at least two levels and each of the memory byte includes emptiness state of a given node and six immediate neighbors in the min-max Reduced Path Octree data structure, wherein bits 0 to 5 of the memory byte are used to store emptiness state information of the six immediate neighboring nodes, bit 6 of the memory byte is used to indicate whether the current node has been updated with useful information and bit 7 is used to store the emptiness state information of the given Reduced Path Octree node;
generating a 2-D image by casting a ray from each pixel of the image into the volume;
visiting each level of the Reduced Path Octree node and determining the emptiness of nodes at each level from the corresponding memory byte during the advancing of said ray; and
sampling along the ray inside only the non-empty nodes of the Reduced Path Octree data structure and skipping empty nodes associated with the min-max Reduced Path Octree data structure along the direction of the ray based on said memory byte included in each node.

17. The system of claim 16, wherein the memory byte system comprises bits indicating an emptiness state of the current node, an emptiness state of neighbor nodes and an update state of the current node.

* * * * *